Patented Aug. 12, 1941

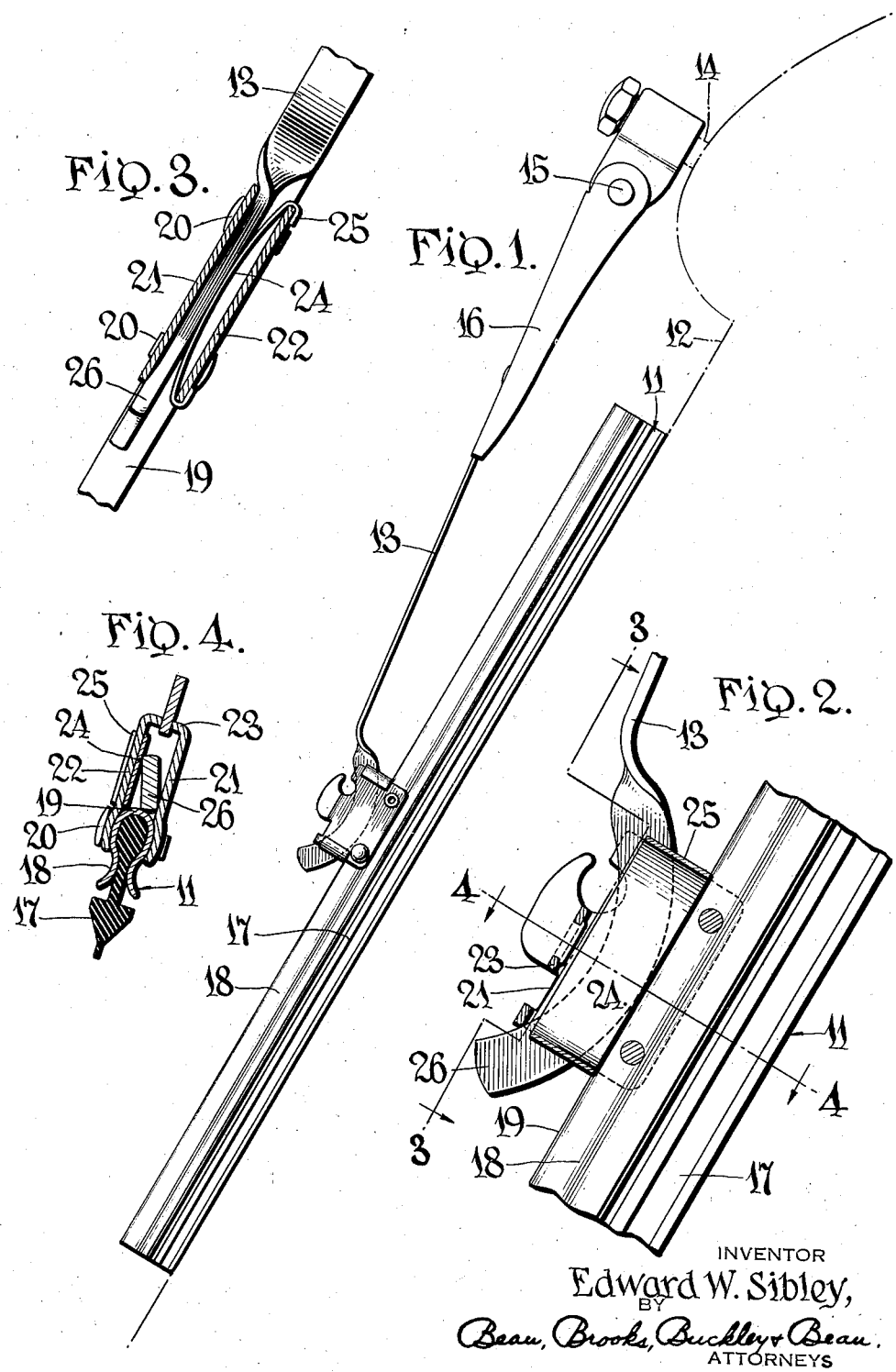

2,252,233

UNITED STATES PATENT OFFICE 2,252,233

WINDSHIELD CLEANER

Edward W. Sibley, Kenmore, N. Y., assignor to Trico Products Corporation, Buffalo, N. Y.

Application March 6, 1939, Serial No. 260,005

7 Claims. (Cl. 15—250)

This invention relates to windshield cleaners and particularly to the structure by which a wiper arm and wiper blade are connected.

According to the invention the wiper blade preferably is provided with a holder comprising spaced flanges receiving therebetween a portion of the wiper arm, and a bowed leaf spring is interposed between the flanges for engaging the received portion of the arm, to resiliently limit relative motion of the blade and arm. The arm is preferably a strip of metal with the portion received between the flanges curved in the plane of its greatest dimensions, the convex edge bearing against the back of the blade to hold the latter uniformly upon the windshield, and the larger flat surfaces of the portion engaging one flange of the holder and the spring.

These and other objects and advantages will appear from the following description of the typical embodiment of the invention illustrated in the accompanying drawing, wherein:

Fig. 1 is a side elevational view of a windshield wiper assembly embodying the invention;

Fig. 2 is an enlarged fragmentary elevational view of the wiper and arm connecting structure, with parts broken away;

Fig. 3 is an enlarged fragmentary view taken substantially along line 3—3 of Fig. 2 with the wiper arm shown in a position it occupies when between the central and terminal phases of its operating stroke; and Fig. 4 is an enlarged cross sectional view taken along the line 4—4 of Fig. 2 with the blade moved to one limit position relative to the arm.

As shown in Fig. 1, the wiper assembly includes a wiper blade 11, held against and moved upon a windshield surface 12 by an arm 13 which may be mounted upon a rock shaft 14 by means including a pivot 15. Suitable means, such as a spring within the upper end 16 of the arm, urge the arm about the pivot 15 toward the windshield to provide suitable pressure of the wiper upon the surface to be cleaned.

The blade 11 may comprise a rubber wiping element 17 and a supporting metal channel 18, the web portion 19 of which constitutes the back of the blade. Secured on the blade by rivets 20 and projecting beyond the back thereof is a clip comprising flanges 21 and 22, preferably substantially parallel, and joined at their outer ends by relatively narrow web portions 23. A leaf spring 24 is disposed between flanges 21 and 22 having its ends 25 anchored to the blade by being bent over the side edges of flange 22.

The adjacent end of wiper arm 13 is preferably formed from a strip of metal, the end portion 26 of which is curved in the plane of its greatest dimensions, the portion 26 being preferably flat in such plane. The blade is releasably attached to the arm by the end portion 26 of the latter being inserted in the holder between flange 21 and the convex side of spring 24, and with the convex edge of portion 26 facing the back 19 of the blade. In this condition the spring 24 is preferably compressed somewhat, so that free flopping motion of the blade relative to the arm, when the arm reverses its direction of motion at the end of each wiping stroke, is prevented. Instead, the spring further compresses, as indicated in Fig. 4, to allow a limited and resiliently restricted tilting of the blade with respect to the arm, resulting in less noise, less wear on the relatively moving parts and, in general, more efficient wiping action. The curvature of the portion 26 of arm 13 prevents displacement of the blade therefrom, except intentional displacement which may be effected by pivoting arm 16 away from the windshield and then sliding the blade from the arm. It also results in a convexly curved edge of the arm pressing against the blade so that wiping pressure is equally distributed at both ends of the wiper blade.

It will be understood that the device herein shown and described is merely the preferred embodiment of the inventive principles involved, and that the latter may be applied to other physical formations without departing from the invention or the scope of the appended claims.

I claim:

1. In a windshield cleaner, a wiper blade having a holder secured to the back thereof comprising substantially rigidly connected and substantially parallel spaced flanges, a bowed leaf spring between the flanges having its ends engaging the ends of one of said flanges to prevent displacement therefrom, and a wiper arm having a portion with substantially flat sides disposed between the convex side of said spring and the other of said flanges.

2. In a windshield cleaner, a wiper blade having a holder secured to the back thereof, said holder comprising two substantially parallel spaced flanges secured to opposite sides of the wiper and a relatively narrow web connecting the flanges, said web being substantially parallel to the back of the wiper and spaced therefrom, a bowed leaf spring between the flanges and between said web and back, said spring having its ends turned over the ends of one flange, and a wiper arm having a curved end portion disposed within said holder, said end portion having a convex edge adapted to abut the back of the blade and substantially flat sides engaging the convex face of the spring and the inner face of the other flange.

3. In a windshield cleaner, a wiper blade having a member extending from the back thereof, a bowed leaf spring having its convex surface facing said member, means for anchoring the ends of the leaf spring with respect to the blade, and a wiper arm having a portion engaged between the convex surface of the spring and said member, said portion being substantially elongated in cross section with its narrow edge facing the back of the wiper and its wide faces engaging said spring and said member.

4. In a windshield cleaner, a wiper blade having a holder on the back thereof comprising substantially rigidly connected spaced and substantially flat flanges, a bowed leaf spring between the flanges, and a wiper arm with a substantially flat portion disposed between and having its opposed substantially flat surfaces engaging the convex surface of the spring and the substantially flat faces of one of the flanges.

5. In a windshield cleaner, a wiper blade having a holder on the back thereof comprising substantially rigidly connected spaced and substantially flat flanges, a bowed leaf spring between the flanges with its convex surface facing a substantially flat face of one of the flanges and its concave surface facing a substantially flat face of the other of said flanges, and a wiper arm having a portion disposed between said convex surface and said one of the flanges.

6. In a windshield cleaner, a wiper blade having a holder on the back thereof comprising spaced substantially rigidly connected and substantially parallel flanges, and a bowed leaf spring between the flanges with its convex surface facing one flange and its concave surface facing the other flange, the spring being compressible toward one of the flanges whereby a wiper arm may be received between the spring and the other flange.

7. In a windshield cleaner, a wiper blade having a holder on the back thereof comprising spaced flanges, a bowed leaf spring between the flanges, and a wiper arm with a portion within said holder, said portion having a convex surface facing the back of the blade and substantially flat opposed surfaces engaging the convex surface of the spring and one of the flanges.

EDWARD W. SIBLEY.

CERTIFICATE OF CORRECTION.

Patent No. 2,252,233. August 12, 1941.

EDWARD W. SIBLEY.

It is hereby certified that error appears in the printed specification of the above numbered patent requiring correction as follows: Page 2, first column, line 25, claim 4, for the word "faces" read --face--; and that the said Letters Patent should be read with this correction therein that the same may conform to the record of the case in the Patent Office.

Signed and sealed this 16th day of September, A. D. 1941.

(Seal)

Henry Van Arsdale,
Acting Commissioner of Patents.